United States Patent
Chung et al.

(10) Patent No.: US 10,372,517 B2
(45) Date of Patent: Aug. 6, 2019

(54) MESSAGE SCHEDULING METHOD

(71) Applicant: TmaxData Co., Ltd., Gyeonggi-do (KR)

(72) Inventors: Eui-Geun Chung, Gyeonggi-do (KR); Dongjin Lee, Gyeonggi-do (KR); Juhyun Kim, Gyeonggi-do (KR)

(73) Assignee: TmaxData Co., Ltd. (KR)

( * ) Notice: Subject to any disclaimer, the term of this patent is extended or adjusted under 35 U.S.C. 154(b) by 28 days.

(21) Appl. No.: 15/693,732

(22) Filed: Sep. 1, 2017

(65) Prior Publication Data

US 2019/0026169 A1    Jan. 24, 2019

(30) Foreign Application Priority Data

Jul. 21, 2017    (KR) .................. 10-2017-0092364

(51) Int. Cl.
  *G06F 9/48*    (2006.01)
  *G06F 9/50*    (2006.01)
  *G06F 9/54*    (2006.01)

(52) U.S. Cl.
  CPC ............ *G06F 9/546* (2013.01); *G06F 9/4881* (2013.01); *G06F 9/5005* (2013.01)

(58) Field of Classification Search
  CPC ....... G06F 9/546; G06F 9/5005; G06F 9/4881
  See application file for complete search history.

(56) References Cited

U.S. PATENT DOCUMENTS

| | | | |
|---|---|---|---|
| 7,690,003 B2 | 3/2010 | Fuller | |
| 9,778,962 B2 | 10/2017 | Jang et al. | |
| 2001/0010053 A1* | 7/2001 | Ben-Shachar | G06F 9/465 718/105 |
| 2007/0067770 A1 | 3/2007 | Thomasson | |
| 2008/0184249 A1* | 7/2008 | Adams | G06F 9/526 718/104 |
| 2010/0107170 A1* | 4/2010 | Stehley | G06F 9/5038 718/103 |
| 2014/0304246 A1* | 10/2014 | Helmich | G06F 9/546 707/704 |

FOREIGN PATENT DOCUMENTS

| | | |
|---|---|---|
| JP | 2017-033095 A | 2/2017 |
| KR | 10-2009-0119032 A | 1/2010 |
| KR | 10-1465657 B1 | 11/2014 |
| KR | 10-1638136 B1 | 7/2016 |

OTHER PUBLICATIONS

Office Action in co-pending Korean Application No. 10-2017-0092364, dated Apr. 13, 2018.

* cited by examiner

*Primary Examiner* — Charles E Anya
(74) *Attorney, Agent, or Firm* — Fish IP Law, LLP

(57) ABSTRACT

Disclosed are a message scheduling method performed by one or more processors of a computing device and a device thereof. The message scheduling method performed by one or more processors of the computing device may include: receiving, by a control thread, a message from a client; adding, by the control thread, a flag to the received message based on contents of the message; storing, by the control thread, the message with the flag added in a queue; and allocating, by the control thread, the message stored in the queue to each worker thread based on the flag.

9 Claims, 8 Drawing Sheets

MESSAGE SCHEDULING METHOD

CROSS-REFERENCE TO RELATED APPLICATIONS

This application claims priority to and the benefit of Korean Patent Application No. 10-2017-0092364 filed in the Korean Intellectual Property Office on Jul. 21, 2017, the entire contents of which are incorporated herein by reference.

TECHNICAL FIELD

The present disclosure relates to a message scheduling method, and more particularly, to a message scheduling method in a database management system.

BACKGROUND ART

SQLite which is a library-based DB that is widely used as an embedded database in the related art uses an OS file lock. For example, when there are clients A and B, in the case where two clients intend to access the same DB, the client A first accessing the DB locks the entirety of a DB file and then, the client B that accesses the DB later is prevented from accessing the corresponding DB. As a result, concurrency of the database is degraded and there is a disadvantage in that overhead is large due to the use of the file lock.

In a DBMS using a client server model in the related art, when two clients access a critical section which is a shared resource similarly as above, the client which first accesses the critical section sets the lock. Since the lock has the overhead, the lock degrades performance.

That is, since the message is processed by multiple threads or processes during lock contention, CPU overhead exists, which purely occurs due to the lock contention. In a structure frequently using the lock as described above, there is a problem in that deadlock is likely to occur due to a performance penalty due to the lock overhead and a user programming (SQL writing) error.

Therefore, there is a demand for a method for enhancing the concurrency and maintaining integrity in a database management system.

Korean Patent Unexamined Publication No. 10-2009-0119032 (Nov. 19, 2009) as an invention regarding a hardware operating system based and shared cache based multi-processor system discloses a configuration regarding a system that stores work information of a waiting queue, a work state and the like in a control thread and granting a priority to the stored information to execute the work.

SUMMARY OF THE INVENTION

The present disclosure has been made in an effort to provide a message scheduling method.

An exemplary embodiment of the present disclosure provides a message scheduling method performed by one or more processors of a computing device. The method may include: receiving, by a control thread, a message from a client; adding, by the control thread, a flag to the received message based on contents of the message; storing, by the control thread, the message with the flag added in a queue; and allocating, by the control thread, the message stored in the queue to each worker thread based on the flag.

Alternatively, the message may be an exclusive mode message which needs to be exclusively processed or a shared mode message which may be processed in parallel.

Alternatively, the flag may include information for dividing the exclusive mode message which needs to be exclusively processed and the shared mode message which may be processed in parallel.

Alternatively, the adding of the flag to the received message based on the contents of the message by the control thread may include determining, by the control thread, an operation mode for processing the corresponding message by determining whether the corresponding message needs to be exclusively processed or is enabled to be processed in parallel based on the contents of the message, and adding the flag to the message based on the determination by the control thread.

Alternatively, the exclusive mode as an operation mode when the contents of the message need to be exclusively processed for consistency may be an operation mode in which the exclusive mode message is processed by one worker thread and when processing the exclusive mode message is completed, a next message stored in the queue is processed by the worker thread and the shared mode as an operation mode when the contents of the message are enabled to be processed in parallel may be an operation mode in which one or more shared mode messages are processed by one or more worker threads in parallel.

Alternatively, the allocating of the message stored in the queue to each worker thread based on the flag by the control thread may include determining, by the control thread, whether the message is the exclusive mode message or the shared mode message based on the flag of the message stored in the queue, allocating, by the control thread, the exclusive mode message to one worker thread when the message is the exclusive mode message, and waiting, by the control thread, for allocating the next message until receiving a report from the worker thread.

Alternatively, the allocating of the message stored in the queue to each worker thread based on the flag by the control thread may include determining, by the control thread, whether the message is the exclusive mode message or the shared mode message based on the flag of the message stored in the queue, allocating, by the control thread, the shared mode message to one worker thread when the message is the shared mode message, determining, by the control thread, whether the next message stored in the queue is the exclusive mode message or the shared mode message, and waiting, by the control thread, for allocating the next message until work of the worker thread is terminated when the next message is the exclusive mode message and allocating, by the control thread, the shared mode message to another worker thread when the next message is the shared mode message.

Alternatively, the method may further include storing, by the control thread, the message received from the client in the queue corresponding to each workgroup and the workgroup may be a minimum unit which needs to maintain the consistency.

Alternatively, the control thread may allocate the exclusive mode messages stored in the queues which belong to different workgroups, respectively to the worker threads in parallel.

Alternatively, the method may further include: receiving, by the control thread, a message execution result from the worker thread; and transferring, by the control thread, the received message execution result to the client.

Alternatively, the method may further include: storing, by the control thread, the message in a back-up database queue in order to asynchronously update the received message to a back-up database; allocating, by the control thread, the message in the back-up database queue to the worker thread; and receiving, by the control thread, the message execution result from the worker thread.

Another exemplary embodiment of the present disclosure provides a computing device for providing message scheduling. The device may include: a control thread receiving a message from a client, and adding a flag to the message based on message contents and storing the message in a queue; a worker thread performing an operation according to the message by being allocated with the message received from the control thread; and a queue storing the message with the flag added depending on the message contents.

Still another exemplary embodiment of the present disclosure provides a computer-readable medium including a computer program including encoded commands. In the computer program stored in a computer readable storage medium, which includes encoded commands in which when the computer program is executed by one or more processors of a computer system, which allows the one or more processor to perform the following steps for providing message scheduling and the steps may include: receiving, by a control thread, a message from a client; adding, by the control thread, a flag to the received message based on contents of the message; storing, by the control thread, the message with the flag added in a queue; and allocating, by the control thread, the message stored in the queue to each worker thread based on the flag.

According to an exemplary embodiment of the present disclosure, a message scheduling method can be provided.

BRIEF DESCRIPTION OF THE DRAWINGS

Some of embodiments are illustrated in the accompanying drawings so as to appreciate features of the mentioned disclosed contents with reference to the following exemplary embodiments through detailed and more concrete description. Further, it is intended that like reference numerals in the drawing denote the same or similar function throughout several aspects. However, the accompanying drawings just illustrate only specific typical exemplary embodiments of the disclosed contents and are not considered to limit the scope of the present disclosure and it should be noted that other exemplary embodiments having the same effect can be sufficiently recognized.

DETAILED DESCRIPTION

Figure 1:
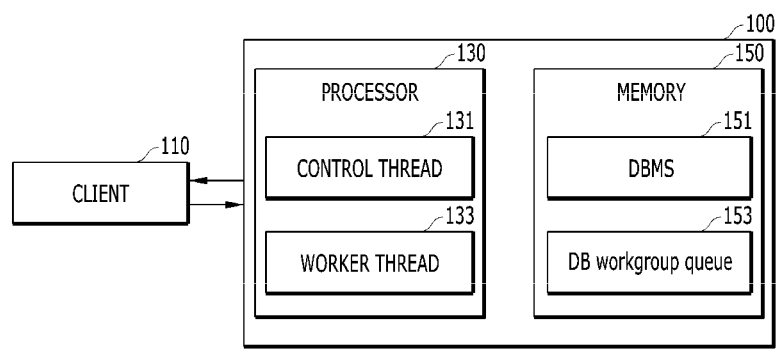
FIG. 1 is a configuration diagram illustrating a system according to an exemplary embodiment of the present disclosure.

Various exemplary embodiments will now be described with reference to drawings. In the present specification, various descriptions are presented to provide appreciation of the present disclosure. However, it is apparent that the exemplary embodiments can be executed without the specific description. In other examples, known structures and apparatuses are presented in a block diagram form in order to facilitate description of the exemplary embodiments.

"Component", "module", "system", and the like which are terms used in the specification refer to a computer-related entity, hardware, firmware, software, and a combination of the software and the hardware, or execution of the software. For example, the component may be a processing process executed on a processor, the processor, an object, an execution thread, a program, and/or a computer, but is not limited thereto. For example, both an application executed in a computing device and the computing device may be the components. One or more components may reside in the processor and/or the execution thread and one component may be localized in one computer or distributed among two or more computers. Further, the components may be executed by various computer-readable media having various data structures, which are stored therein. The components may perform communication through local and/or remote processing according to a signal (for example, data from one component that interacts with other components and/or data through another system and a network such as the Internet through a signal in a local system and a distribution system) having one or more data packets, for example.

It should be appreciated that the word "comprises" and/or "comprising" means that the corresponding feature and/or component is present, but presence or inclusion of one or more other features, components, and/or a group thereof is not excluded. Further, when not separately specified or not clear in terms of the context that a singular form is indicated, it should be construed that a singular form generally means "one or more" in the present specification and the claims.

The objects and effects of the present disclosure, and technical constitutions of accomplishing these will become obvious with reference to exemplary embodiments to be described below in detail along with the accompanying drawings. In describing the present disclosure, a detailed description of known function or constitutions will be omitted if it is determined that it unnecessarily makes the gist of the present disclosure unclear. In addition, terms to be described below as terms which are defined in consideration of functions in the present disclosure may vary depending on the intention or usual practice of a user or an operator.

However, the present disclosure is not limited to exemplary embodiments disclosed below but may be implemented in various different forms. However, the exemplary embodiments are provided to make the present disclosure be complete and completely announce the scope of the present disclosure to those skilled in the art to which the present disclosure belongs and the present disclosure is just defined by the scope of the claims. Accordingly, the terms need to be defined based on contents throughout this specification.

FIG. 1 is a configuration diagram illustrating a system according to an exemplary embodiment of the present disclosure. A description of FIG. 1 is a description of an operation in one DB workgroup like examples illustrated in FIGS. 3A and 4A and the description of multiple DB workgroups will be made below in detail in the description of FIGS. 3B and 4B.

According to the exemplary embodiment of the present disclosure, at least one client 110 and at least one computing device 100 may be included in the system of the present disclosure. The computing device 100 may include a processor 130 and a memory 150. The processor 130 may include one or more control threads 131 and one or more worker threads 133. Further, the memory 150 may include a database (DB), a database management system (DBMS) 151, and a DB workgroup queue 153.

The control thread 131 as one of threads of the processor of the computing device may control the worker thread to process a message by allocating a message received from a client to the worker thread. The control thread 131 may control an operation of the worker thread 133 by controlling the allocation of the message according to the exemplary embodiment of the present disclosure.

The worker thread 133 as one of the threads of the processor of the computing device may process the allocated message. One or more worker threads 133 may be provided and a plurality of worker threads 133 may process the message in parallel, respectively according to an operation mode of the computing device 100 of the present disclosure and only one worker thread 133 may process one message at a time.

The control thread 131 of the processor 130 may receive the message from the client 110. The message may be an exclusive mode message which needs to be exclusively processed or a shared mode message which may be processed in parallel.

More specifically, in the database, consistence, a high speed, and stability of data are important. To this end, the computing device 100 according to the exemplary embodiment of the present disclosure changes a processing method by dividing the operation mode according to contents of the message to perform efficient processing. When the control thread 131 of the processor 130 receives the message from the client 110, the control thread 131 may process the message by dividing the operation mode based on the message contents. The message may include a message to write the contents of the database and a message to read the contents of the database. Therefore, according to the exemplary embodiment of the present disclosure, in the computing device 100, the message to write the contents of the database proceeds to the exclusive mode to achieve the consistency and the stability of the data and the message to read the contents of the database proceeds to the shared mode to achieve rapid processing through parallel processing.

For example, the exclusive mode message as a message of a type to write the contents of the database primarily corresponds to a message to modify the contents of the database, such as insert, update, and delete in a data manipulation language (DML) of a structured query language (SQL). The shared mode message as a message of a type to read the contents of the database corresponds to a select message in the data manipulation language (DML) of the SQL. The description of the message type is just an example and the present disclosure is not limited thereto.

A flag may be added to the message received by the control thread 131 of the processor 130 based on the received message contents. The flag may include information for dividing the exclusive mode message which needs to be exclusively processed and the shared mode message which may be processed in parallel.

In more detail, when the control thread 131 of the processor 130 receives the message from the client, the control thread adds the flag to the received message based on the message contents. The reason for adding the flag to the received message is for the control thread 131 to divide and process the operation mode of the message at the time of allocating the message stored in the queue to the worker thread 133. The flag includes the information for dividing the exclusive mode message which needs to be exclusively processed and the shared mode message which may be processed in parallel.

The exclusive mode is an operation mode when the contents of the message need to be exclusively processed for the consistency. In the exclusive mode, the exclusive mode message is exclusively processed by one worker thread 133 and until processing the exclusive mode message is completed, a next message stored in the queue is not allocated to the worker thread 133. When the worker thread 133 reports that processing of the exclusive mode message is completed to the control thread 131, the control thread 131 then allocates the next message to the worker thread 133. That is, while the exclusive mode message is processed, only one message may be processed by the worker thread 133 at a time.

For example, when the computing device 100 receives one or more messages from one or more clients 110, the control thread 131 may add a flag that indicates that one or more messages are the insert, update, delete, or select message according to the message contents and store the added flag in the queue 153. When the control thread 131 receives the insert message as a first message and the select message which is the next message in sequence, the control thread 131 adds a flag that indicates that the insert message as the first message is the exclusive mode message and stores the added flag in the queue 153. The control thread 131 checks whether to execute another message (e.g., a message which belongs to the same workgroup as the insert message) which is impossible to execute simultaneously with the insert message in the worker thread 133 before allocating the insert message to the worker thread 133 and when another message is not executed, the control thread 131 allocates the insert message stored in the queue 153 to the worker thread 133. In addition, the control thread 131 adds a flag indicating that the select message as the next message is the shared mode message and stores the added flag in the queue 153. Thereafter, the control thread 131 allocates the select message as the next message to the worker thread 133 and processes the allocated select message after receiving the report that processing of the first message is completed from the worker thread 133. The description of the exclusive mode is just an example and the present disclosure is not limited thereto.

The shared mode is an operation mode when the contents of the message may be processed in parallel. The shared mode is an operation mode to process one or more messages in parallel for rapid processing of a message which is not related with the consistency of the data. In the shared mode, the shared mode message is allocated to one worker thread 133 and the stored next shared mode message is allocated to another worker thread 133 to simultaneously process the shared mode message in parallel. That is, in the case of the shared mode message, the messages may be simultaneously processed by multiple worker threads 133.

For example, when the computing device 100 receives one or more messages from one or more clients 110, the control thread 131 adds the flag that indicates that one or more messages are the insert, update, delete, or select message according to the message contents. When the control thread 131 receives the select message as the first message and the select message even as the next message in sequence, all of the received messages are the shared mode messages. Therefore, the control thread 131 allocates the first select message to the worker thread 133 and the control thread 131 allocates the select message as the next message to another worker thread 133 without the need for receiving the completion report from the worker thread 133. As a result, the messages received from the client 110 may be simultaneously processed by one or more worker threads 133 to enhance a processing speed. The description of the shared mode is just an example and the present disclosure is not limited thereto.

The control thread 131 of the processor 130 may store the messages with the flag in the queue 153. In more detail, the control thread 131 of the processor 130 may store the messages with the flag added in the corresponding DB workgroup queue 153 in an order to receive the messages. The queue 153 may exist for each workgroup to correspond to the workgroup. The workgroup may be a minimum unit in which the data consistency needs to be maintained. The workgroup may be constituted by, for example, one database including a plurality of tables. Further, the workgroup may be constituted by a set of the plurality of databases. In the exemplary embodiment of the present disclosure, the consistency of the data needs to be maintained in the same workgroup and maintaining the data consistency may not be needed between different workgroups. The control thread 131 receives the message to determine with which workgroup the corresponding message is a message related based on information of the message and adds the flag to the message to store the message with the flag added in the queue 153 corresponding to the corresponding workgroup.

For example, the control thread 131 may identify a database targeted by the corresponding message based on the message information, and as a result, the corresponding message may be stored in the identified workgroup queue 153. The example is just an example for describing the present disclosure and the present disclosure is not limited thereto.

The control thread 131 of the processor 130 may allocate the message stored in the queue to each worker thread 133 based on the flag. When the control thread 131 allocates the message to each worker thread 133, the control thread 131 may determine whether the message is the exclusive mode message or the shared mode message based on the flag of the message stored in the queue and allocate the message to the worker thread 133 based on the determination.

When the message is the exclusive mode message, the control thread 131 may allocate the exclusive mode message to one worker thread 133. The control thread 131 may wait for allocation of the next message until receiving the report that processing the allocated message is completed from the worker thread 133. Further, the control thread 131 may allocate the exclusive mode message to the worker thread 133 by waiting for the processing completion when the message (e.g., a previous exclusive mode message for workgroup 1 is being processed by the worker thread when intending to allocate the exclusive mode message for current workgroup 1) of the workgroup corresponding to the corresponding exclusive mode message is being processed by the worker thread 133 at the time of intending to allocate the exclusive mode message. When the message is being processed by the worker thread 133, the consistency may be influenced even in the case where the exclusive mode message is allocated, and as a result, the control thread 131 may allocate the exclusive mode message after the worker thread 133 completes processing the message when the control thread 131 needs to maintain the consistency.

In more detail, when the control thread 131 allocates the message stored in the queue to the worker thread 133 based on the flag, the control thread 131 may determine whether the message is the exclusive mode message or the shared mode message based on the flag added with the message. When the message is the exclusive mode message, the control thread 131 may allocate the exclusive mode message to one worker thread 133. The control thread 131 may wait for allocation of the next message to another worker thread 133 until receiving the report that processing the allocated message is completed from the worker thread 133 which is being allocated with the exclusive mode message. The control thread 131 may determine whether the next message is the exclusive mode message or the shared mode message in advance while the worker thread 133 waits for allocating the next message or determine whether the message is the exclusive mode message or the shared mode message after receiving the report regarding the processing completion of the allocated message from the worker thread 133.

For example, when the contents of the received message are the message to modify the contents of the database, such as insert, update, or delete in the DML, the message may operate in the exclusive mode. In this case, the control thread 131 may determine the operation mode of the message based on the flag added to the message while the control thread 131 waits for allocating the next message until receiving the report regarding the processing completion of the allocated message from the worker thread 133 after allocating the messages such as insert, update, and delete to one worker thread 133 or the control thread 131 may determine the operation mode of the message after receiving the report regarding the processing completion of the allocated message from the worker thread 133. The example is just an example for describing the present disclosure and the present disclosure is not limited thereto.

When the message is the shared mode message, the control thread 131 may allocate the shared mode message to one worker thread 133. The control thread 131 may determine whether the next message stored in the queue is the exclusive mode message or the shared mode message. When the next message is the exclusive mode message, the control thread 131 may wait for allocating the next message until the work of the worker thread 133 is terminated and when the next message is the shared mode message, the control thread 131 may allocate the next message to another worker thread 133 regardless whether to complete processing of the message in the shared mode.

For example, when the contents of the received message are the select message which is a read only memory of the database in the DML, the message may operate in the shared mode. In this case, the control thread 131 may allocate to the select message to one worker thread 133. The control thread 131 may determine whether the next message stored in the queue is the exclusive mode message or the shared mode message. When the next message is the exclusive mode message to modify the contents of the database (that is, the exclusive mode message), the control thread 131 may wait for allocating the next message until the work of the worker thread 133 is terminated and when the next message is the shared mode message, the control thread 131 may allocate to the shared mode message to another worker thread 133. The example is just an example for describing the present disclosure and the present disclosure is not limited thereto.

The memory 150 may store a command and information required for the computing device 100 to provide the message scheduling method according to the exemplary embodiment of the present disclosure. The memory 150 may include the database management system (DBMS) 151, the DB workgroup queue 153, and the database (DB). The DBMS 151 as a separate software processor that manipulates the database may be driven while being loaded onto the memory. The DB workgroup queue 153 includes a storage space which may temporarily store the message to correspond to each workgroup. The database (DB) means a set of data integrated and managed so as to be shared and used by multiple persons. The database (DB) may be positioned in the memory 150 and positioned in an external device.

The memory 150 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk, but the present disclosure is not limited thereto.

According to the exemplary embodiment of the present disclosure, when the message is scheduled by varying the operation mode depending on the message contents, the worker thread 133 that receives and executes the message may perform work without locking a shared resource. As a result, CPU overhead does not occur due to a lock contention at the time of approaching the DB. This may assist performance enhancement in an embedded system or a personal PC having low calculation performance and further, DB stability may be achieved by originally blocking the number of cases where deadlock occurs due to the lock contention.

Figure 2:
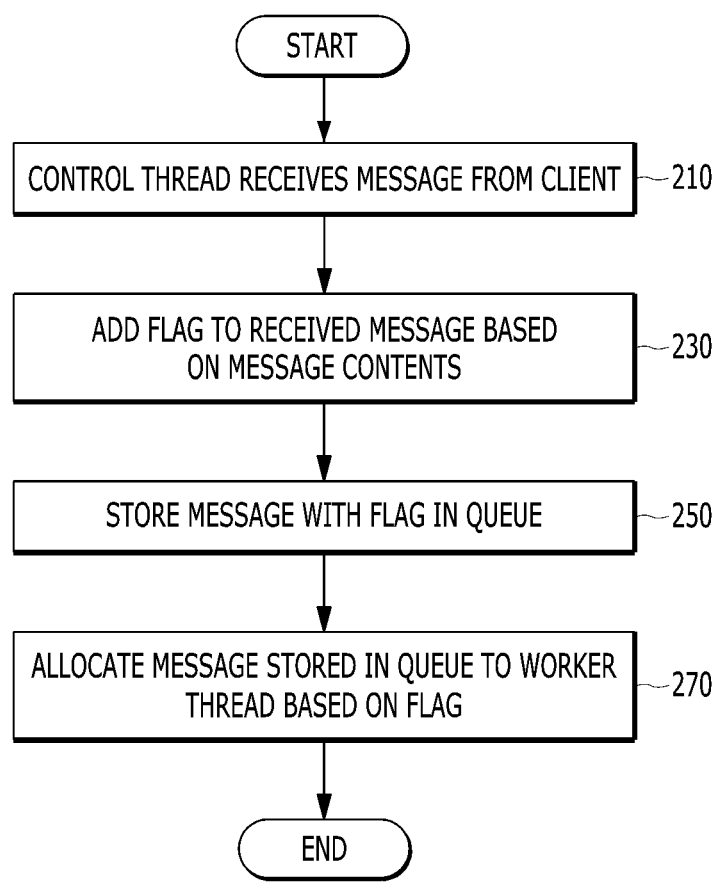
FIG. 2 is a flowchart illustrating a message scheduling method performed by a processor of a computing device according to an exemplary embodiment of the present disclosure.

FIG. 2 is a flowchart illustrating a message scheduling method performed by a processor of a computing device according to an exemplary embodiment of the present disclosure. The description of FIG. 2 is the description of the operation in one DB workgroup like the examples illustrated in FIGS. 3A and 4A and the description of multiple DB workgroups will be made below in detail in the description of FIGS. 3B and 4B.

The control thread 131 of the processor 130 may receive the message from the client 110 (210). The received message may be an exclusive mode message which needs to be exclusively processed or a shared mode message which may be processed in parallel.

In more detail, for the consistency and the stability of the database, the computing device 100 according to the exemplary embodiment of the present disclosure changes a processing method by dividing the operation mode according to contents of the message to perform efficient processing. When the control thread 131 of the processor 130 receives the message from the client 110, the control thread 131 may process the message by dividing the operation mode based on the message contents. The message may include a message to write the contents of the database and a message to read the contents of the database. Therefore, according to the exemplary embodiment of the present disclosure, in the computing device 100, the message to write the contents of the database proceeds to the exclusive mode to achieve the consistency and the stability of the data and the message to read the contents of the database proceeds to the shared mode to achieve rapid processing through parallel processing.

For example, the exclusive mode message as a message of a type to write the contents of the database primarily corresponds to a message to modify the database, such as insert, update, and delete in a data manipulation language (DML) of a structured query language (SQL). The shared mode message as a message of a type to read the contents of the database corresponds to a select message in the data manipulation language (DML) of the SQL. The description of the message type is just an example and the present disclosure is not limited thereto.

The control thread 131 of the processor 130 may add the flag to the received message based on the contents of the message (230). The flag may include information for dividing the exclusive mode message which needs to be exclusively processed and the shared mode message which may be processed in parallel.

In more detail, when the control thread 131 of the processor 130 receives the message from the client 110, the control thread 131 may add the flag to the received message based on the message contents. The reason for adding the flag to the received message is for the control thread 131 to divide and process the operation mode of the message at the time of allocating the message stored in the queue to the worker thread 133. The flag includes the information for dividing the exclusive mode message which needs to be exclusively processed and the shared mode message which may be processed in parallel.

The exclusive mode is an operation mode when the contents of the message need to be exclusively processed for the consistency. In the exclusive mode, the exclusive mode message is exclusively processed by one worker thread 133 and until processing the exclusive mode message is completed, a next message stored in the queue is not allocated to the worker thread 133. When the worker thread 133 reports that processing of the exclusive mode message is completed to the control thread 131, the control thread 131 then allocates the next message to the worker thread 133. That is, while the exclusive mode message is processed, only one message may be processed by the worker thread 133 at a time.

For example, when the computing device 100 receives one or more messages from one or more clients 110, the control thread 131 may add the flag that indicates that one or more messages are the insert, update, delete, or select message according to the message contents and store the added flag in the queue 153. When the control thread 131 receives the insert message as a first message and the select message which is the next message in sequence, the control thread 131 adds a flag that indicates that the insert message as the first message is the exclusive mode message and stores the added flag in the queue 153. The control thread 131 checks whether to execute another message (e.g., a message which belongs to the same workgroup as the insert message) which is impossible to execute simultaneously with the insert message in the worker thread 133 before allocating the insert message to the worker thread 133 and when another message is not executed, the control thread 131 allocates the insert message stored in the queue 153 to the worker thread 133. In addition, the control thread 131 adds a flag indicating that the select message as the next message is the shared mode message and stores the added flag in the queue 153. Thereafter, the control thread 131 allocates the select message as the next message to the worker thread 133 and process the allocated select message after receiving the report that processing of the first message is completed from the worker thread 133. The description of the exclusive mode is just an example and the present disclosure is not limited thereto.

The shared mode is an operation mode when the contents of the message may be processed in parallel. The shared mode is an operation mode to process one or more messages in parallel for rapid processing because the shared mode is not related with the consistency of the data. In the shared mode, the shared mode message is allocated to one worker thread 133 and the stored next shared mode message is allocated to another worker thread 133 to simultaneously process the shared mode message in parallel. That is, in the case of the shared mode message, the messages may be simultaneously processed by multiple worker threads 133.

For example, when the computing device 100 receives one or more messages from one or more clients 110, the control thread 131 adds the flag that indicates that one or more messages are the insert, update, delete, or select message according to the message contents. When the control thread 131 receives the select message as the first message and the select message even as the next message in sequence, all of the received messages are the shared mode messages. Therefore, the control thread 131 allocates the first select message to the worker thread 133 and the control thread 131 allocates the select message as the next message to another worker thread 133 without the need for receiving the completion report from the worker thread 133. As a result, the messages received from the client 110 may be simultaneously processed by one or more worker threads 133 to enhance a processing speed. The description of the shared mode is just an example and the present disclosure is not limited thereto.

The control thread 131 of the processor 130 may store the message with the flag added in the queue 153 (250). In more detail, the control thread 131 of the processor 130 may store the messages with the flag added in the corresponding DB workgroup queue 153 in an order to receive the messages. The queue 153 may exist for each workgroup to correspond to the workgroup. The workgroup may be a minimum unit in which the data consistency needs to be maintained. The workgroup may be constituted by, for example, one database including a plurality of tables. Further, the workgroup may be constituted by a set of the plurality of databases. In the exemplary embodiment of the present disclosure, the consistency of the data needs to be maintained in the same workgroup and maintaining the data consistency may not be needed between different workgroups. The control thread 131 receives the message to determine with which workgroup the corresponding message is a message related based on information of the message and adds the flag to the message to store the message with the flag added in the queue 153 corresponding to the corresponding workgroup.

For example, the control thread 131 may identify a database targeted by the corresponding message based on the message information, and as a result, the corresponding message may be stored in the identified workgroup queue 153. The example is just an example for describing the present disclosure and the present disclosure is not limited thereto.

The control thread 131 of the processor 130 may allocate the message stored in the queue to each worker thread 133 based on the flag (270). When the control thread 131 allocates the message to each worker thread 133, the control thread 131 may determine whether the message is the exclusive mode message or the shared mode message based on the flag of the message stored in the queue and allocate the message based on the determination.

When the message is the exclusive mode message, the control thread 131 may allocate the exclusive mode message to one worker thread 133. The control thread 131 may wait for allocation of the next message until receiving the report that processing the allocated message is completed from the worker thread 133. Further, the control thread 131 may allocate to the exclusive mode message to the worker thread 133 by waiting for processing completion in the case where the message of the workgroup corresponding to the corresponding exclusive mode message is being processed by the worker thread 133 when intending to allocate the exclusive mode message. When the message is being processed by the worker thread 133, the consistency may be influenced even in the case where the exclusive mode message is allocated, and as a result, the control thread 131 may allocate the exclusive mode message after the worker thread 133 completes processing the message when there is a need for maintaining the consistency.

In more detail, the control thread 131 may determine whether the message is the exclusive mode message or the shared mode message based on the flag added to the message. When the message is the exclusive mode message, the control thread 131 may allocate the exclusive mode message to one worker thread 133. The control thread 131 may wait for allocation of the next message until receiving the report that processing the allocated message is completed from the worker thread 133. Further, the control thread 131 may allocate the exclusive mode message to the worker thread by waiting for processing completion in the case where the message of the workgroup corresponding to the corresponding exclusive mode message is being processed by the worker thread 133 when intending to allocate the exclusive mode message. When the message is being processed by the worker thread 133, the consistency may be influenced even in the case where the exclusive mode message is allocated, and as a result, the control thread 131 may allocate the exclusive mode message after the worker thread 133 completes processing the message when there is a need for maintaining the consistency.

For example, when the contents of the received message are the message to modify the contents of the database, such as insert, update, or delete in the data manipulation language (DML), the message may operate in the exclusive mode. In this case, the control thread 131 may determine the operation mode of the message based on the flag added to the message while waiting for allocating the next message until receiving the report regarding the processing completion of the message from the worker thread 133 after allocating the insert message to one worker thread 133 or the control thread 131 may determine the operation mode of the message after receiving the report regarding the processing completion of the message from the worker thread 133. The example is just an example for describing the present disclosure and the present disclosure is not limited thereto.

When the message is the shared mode message, the control thread 131 may allocate the shared mode message to one worker thread 133. The control thread 131 may determine whether the next message stored in the queue is the exclusive mode message or the shared mode message. When the next message is the exclusive mode message, the control thread 131 may wait for allocating the next message until the work of the worker thread 133 is terminated and when the next message is the shared mode message, the control thread 131 may allocate the next message to another worker thread 133 regardless whether to complete processing of the message in the shared mode.

For example, when the contents of the received message are the select message which is a read only memory message of the database in the DML, the message may operate in the shared mode. In this case, the control thread 131 may allocate the select message to one worker thread 133. The control thread 131 may determine whether the next message stored in the queue is the exclusive mode message or the shared mode message. When the next message is the exclusive mode message to modify the contents of the database, the control thread 131 may wait for allocating the next message until the work of the worker thread 133 is terminated and when the next message is the shared mode message, the control thread 131 may allocate to the shared mode message to another worker thread 133. The example is just an example for describing the present disclosure and the present disclosure is not limited thereto.

According to the exemplary embodiment of the present disclosure, when the message is scheduled by varying the operation mode depending on the message contents, the worker thread 133 that receives and executes the message may perform work without locking a shared resource. As a result, CPU overhead does not occur due to a lock contention at the time of approaching the DB. This may assist performance enhancement in an embedded system or a personal PC having low calculation performance and further, DB stability may be achieved by originally blocking the number of cases where deadlock occurs due to the lock contention.

Figure 3A:
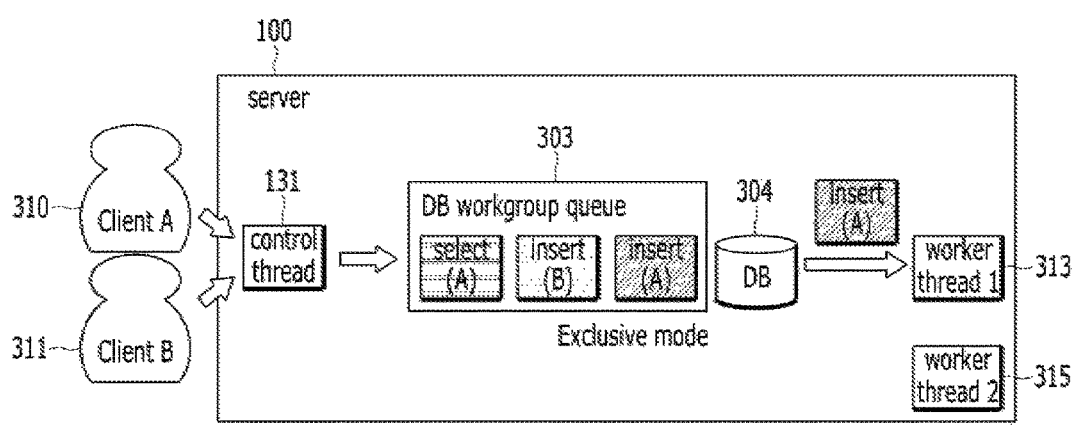
FIG. 3A is a conceptual diagram of an operation of processing a message in an exclusive mode for one workgroup according to an exemplary embodiment of the present disclosure.

FIG. 3A is a conceptual diagram of an operation of processing a message in an exclusive mode for one workgroup according to an exemplary embodiment of the present disclosure.

The computing device 100 may receive a message from client A 310 and client B 311. The message may be an exclusive mode message which needs to be exclusively processed or a shared mode message which may be processed in parallel. For example, the exclusive mode message may include one message of insert, update, and delete to modify the contents of the database and the shared mode message may include a select message. The example is just an example for describing the present disclosure and the present disclosure is not limited thereto.

The client A 310 may request insert and select to the computing device 100 in sequence and the client B 311 may request insert. The control thread 131 of the computing device 100 receives each request message to identify a workgroup targeted by each message and store each message in each queue corresponding to the identified workgroup.

For example, in the example of FIG. 3A, the insert message of the client A 310, the insert message of the client B 311, and the select message of the client A 310 may be sequentially stored in a DB workgroup queue 303. The DB workgroup queue 303 is a queue for a DB 304 which the client A 310 and the client B 311 intend to approach. A first stored message of the DB workgroup queue 303 is the insert message received from the client A 310 and the message is the message which operates in the exclusive mode. The control thread 131 allocates the insert message to one first worker thread 313 to enable the first worker thread 313 to process the message. Until execution of the first worker thread 313 is completed, other messages (e.g., the insert message of the client B and the select message of the client A) may be made to wait. Thereafter, the first worker thread 313 may report execution completion of the message processing to the control thread 131. Further, the control thread 131 may allocate the insert message received from the client B 311, which is the next message to one worker thread (one of the first worker thread and a second worker thread). The example is just an example for describing the present disclosure and the present disclosure is not limited thereto.

Figure 3B:
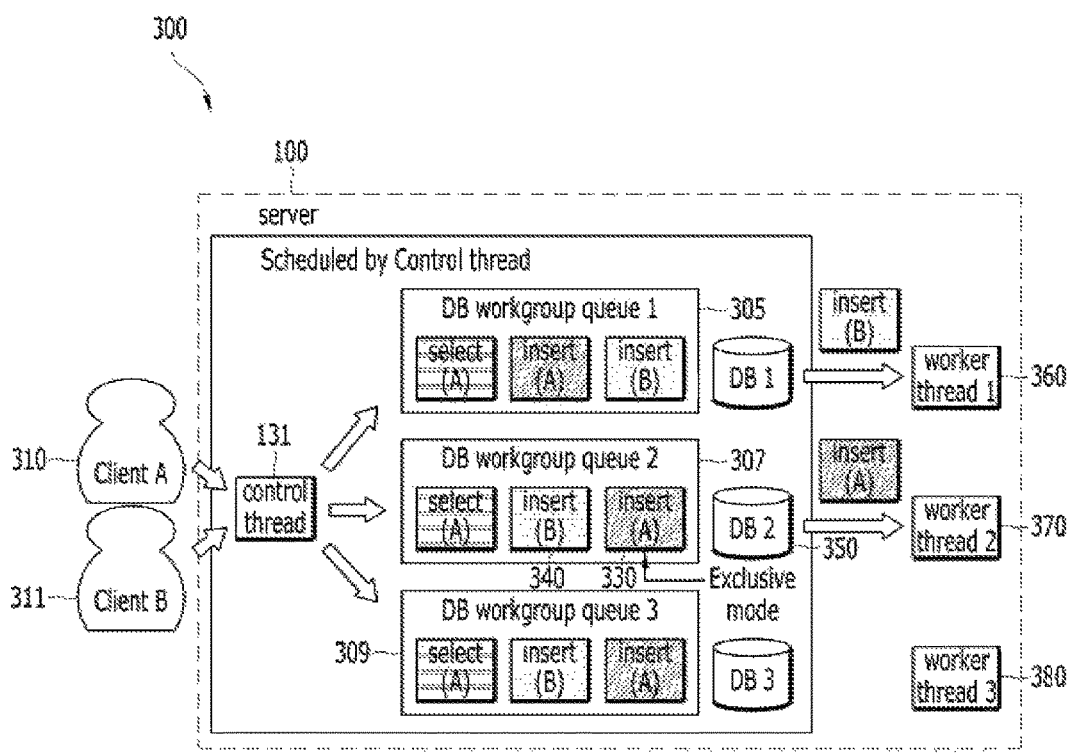
FIG. 3B is a conceptual diagram of the operation of processing the message in the exclusive mode for multiple workgroups according to the exemplary embodiment of the present disclosure.

FIG. 3B is a conceptual diagram of the operation of processing the message in the exclusive mode for multiple workgroups according to the exemplary embodiment of the present disclosure.

In the exemplary embodiment of the present disclosure, multiple workgroups may exist in the system. The workgroup means a minimum unit in which the data consistency needs to be maintained. The control thread 131 may store the message received from the client in the queue corresponding to each workgroup (e.g., reference numeral 305, 307, or 309 of FIG. 3B) based on message information. That is, another workgroup means another database. For example, one database may mean one workgroup and one workgroup may include multiple tables.

The control thread 131 may store the message received from the client 110 in the queue corresponding to each workgroup. The control thread 131 may receive the message from the client 110 and the control thread 131 may allocate the received message to the corresponding workgroup according to information of the received message. The control thread 131 may identify a database (that is, workgroup) targeted by the corresponding message based on the message information and store the corresponding message in the identified workgroup queue. For example, the control thread 131 may store the message in a first DB workgroup queue 305 when the message received from the client A 310 is a message regarding a first DB. Further, the control thread 131 may store the message in a third DB workgroup queue 309 when the message received from the client B 311 is a message regarding a third DB. The example is just an example for describing the present disclosure and the present disclosure is not limited thereto.

The control thread 131 may allocate the exclusive mode messages stored in the queues which belong to different workgroups, respectively to the worker threads in parallel. The reason is that consistency needs not be maintained among the different workgroups. In more detail, when the workgroups are different from each other, the control thread 131 may allocate the exclusive mode messages stored in the respective queues to worker threads 360, 370, and 380 in parallel. Therefore, when the workgroups are different from each other, the control thread 131 may allocate the messages to the worker threads 360, 370, and 380 in parallel regardless of whether the message contents are the exclusive mode message or the shared mode message and the respective worker threads which are allocated with the messages may simultaneously operate.

For example, in the example of FIG. 3B, the insert message of the client B 311, the insert message of the client A 310, and the select message of the client A 310 may be stored in the first workgroup queue 305 in sequence and the insert message of the client A 310, the insert message of the client B 311, and the select message of the client A 310 may be stored in the second workgroup queue 307 in sequence. Since the message stored in the first workgroup queue 305 and the message stored in the second workgroup queue 307 are messages for different workgroups, the insert message of the client B 311, which is stored in the first workgroup queue 305 and the insert message of the client A 310, which is stored in the second workgroup queue 307 need not maintain the consistency with each other. Therefore, the control thread 131 may simultaneously allocate the insert message of the client B 311, which is stored in the first workgroup queue 305 and the insert message of the client A 310, which is stored in the second workgroup queue 307 to the worker threads 360 and 370. That is, the message stored in the first workgroup queue 305 and the message stored in the second workgroup queue 307 may be allocated to the worker threads, respectively in parallel. The example is just an example for describing the present disclosure and the present disclosure is not limited thereto.

Figure 4A:
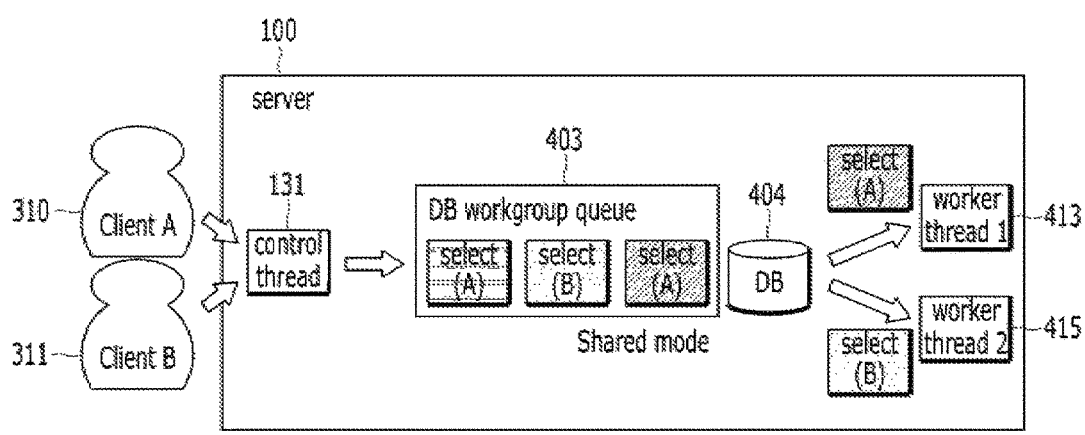
FIG. 4A is a conceptual diagram of the operation of processing the message in a shared mode for one workgroup according to the exemplary embodiment of the present disclosure.

FIG. 4A is a conceptual diagram of the operation of processing the message in a shared mode for one workgroup according to the exemplary embodiment of the present disclosure.

The computing device 100 may receive the message from the client A 310 and the client B 311. The received message may be the exclusive mode message which needs to be exclusively processed or the shared mode message which may be processed in parallel. For example, the exclusive mode message may include one message of insert, update, and delete and the shared mode message may include the select message. The example is just an example for describing the present disclosure and the present disclosure is not limited thereto.

The client A 310 may request the select message to the computing device 100 and the client B 311 may request the select message. The control thread 131 of the computing device 100 receives each request message to identify a workgroup targeted by each message and store each message in each queue corresponding to the identified workgroup.

For example, in the example of FIG. 4A, the select message of the client A 310, the select message of the client B 311, and the select message of the client A 310 may be sequentially stored in a DB workgroup queue 403. The DB workgroup queue 403 is a queue for a DB 404 which the client A 310 and the client B 311 intend to approach. The first stored message of the DB workgroup queue 403 is the select message received from the client A 310 and the message is the message which operates in the shared mode. The control thread 131 allocates the select message to one first worker thread 413 to enable the first worker thread 413 to process the message. Unlike the exclusive mode, the control thread 131 may allocate the select message of the client B 311, which is the next message to a second worker thread 415 without the need for waiting other messages until execution of the first worker thread 413 is completed. That is, the select message as the message which is in the shared mode may be simultaneously performed by multiple worker threads. The example is just an example for describing the present disclosure and the present disclosure is not limited thereto.

Figure 4B:
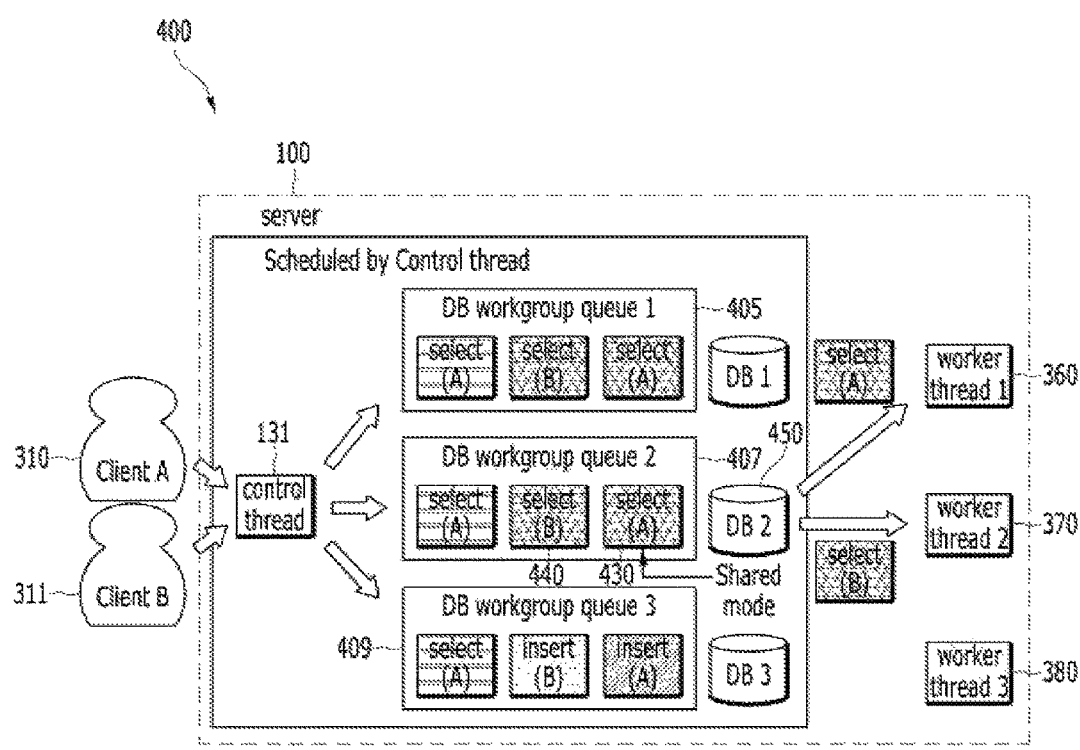
FIG. 4B is a conceptual diagram of the operation of processing the message in the shared mode for multiple workgroups according to the exemplary embodiment of the present disclosure.

FIG. 4B is a conceptual diagram of the operation of processing the message in the shared mode for multiple workgroups according to the exemplary embodiment of the present disclosure.

In the exemplary embodiment of the present disclosure, multiple workgroups may exist. The workgroup means a minimum unit in which the data consistency needs to be maintained. The control thread 131 may store the message received from the client 110 in the queue corresponding to each workgroup (e.g., reference numeral 405, 407, or 409 of FIG. 4B).

The control thread 131 may store the message received from the client 110 in the queue corresponding to each workgroup based on the information of the message. The control thread 131 may receive the message from the client 110 and the control thread 131 may allocate the received message to the corresponding workgroup according to the information of the received message. For example, the control thread 131 may store the message in a first DB workgroup queue 405 when the information of the message received from the client A 310 is the message regarding the first DB. Further, the control thread 131 may store the message in a third DB workgroup queue 409 when the information of the message received from the client B 311 is the message regarding the third DB. The example is just an example for describing the present disclosure and the present disclosure is not limited thereto.

The control thread 131 may allocate the shared mode messages stored in the queues which belong to different workgroups, respectively to the worker threads in parallel. The reason is that the consistency needs not be maintained among the different workgroups. In more detail, when the workgroups are different from each other, the control thread 131 may allocate the shared mode messages stored in the respective queues to worker threads 360, 370, and 380 in parallel. Therefore, when the workgroups are different from each other, the control thread 131 may allocate the messages to the worker threads 360, 370, and 380 in parallel regardless of whether the message contents are the exclusive mode message or the shared mode message and the respective worker threads which are allocated with the messages may simultaneously operate.

For example, in the example of FIG. 4B, the select message of the client A 310, the select message of the client B 311, and the select message of the client A 310 may be stored in the first workgroup queue 405 in sequence and the insert message of the client A 310, the insert message of the client B 311, and the select message of the client A 310 may be stored in the third workgroup queue 409 in sequence. Since the message stored in the first workgroup queue 405 and the message stored in the third workgroup queue 409 are messages for different workgroups, the select message of the client A 310, which is stored in the first workgroup queue 405 and the insert message of the client A 310, which is stored in the third workgroup queue 409 need not maintain the consistency with each other. Therefore, the control thread 131 may simultaneously allocate the select message of the client A 310, which is stored in the first workgroup queue 405 and the insert message of the client A 310, which is stored in the third workgroup queue 409 to the worker threads 360 and 370. That is, the message stored in the first DB workgroup queue 405 and the message stored in the third workgroup queue 409 may be allocated to the worker threads, respectively in parallel. The example is just an example for describing the present disclosure and the present disclosure is not limited thereto.

According to the exemplary embodiment of the present disclosure, when the message is scheduled by varying the operation mode depending on the message contents, the worker thread 133 that receives and executes the message may perform work without locking a shared resource. As a result, CPU overhead does not occur due to a lock contention at the time of approaching the DB. This may assist performance enhancement in an embedded system or a personal PC having low calculation performance and further, DB stability may be achieved by originally blocking the number of cases where deadlock occurs due to the lock contention.

Figure 5:
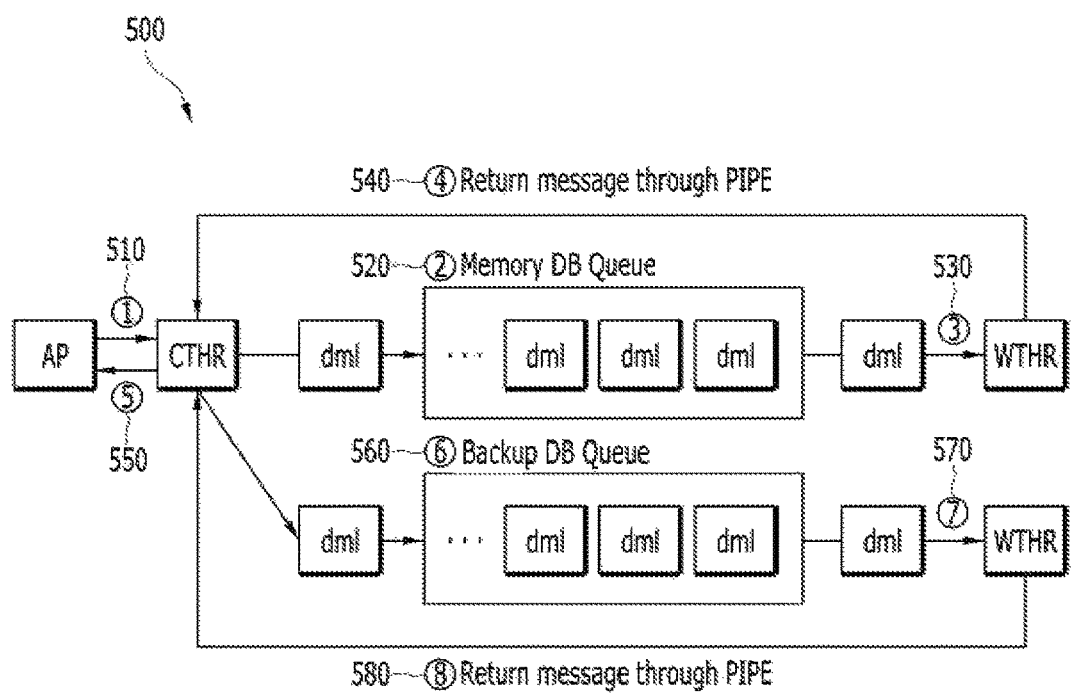
FIG. 5 is a schematic view of an asynchronous data backup process using the message scheduling method according to the exemplary embodiments of the present disclosure.

FIG. 5 is a schematic view of an asynchronous data backup process using the message scheduling method in which the exemplary embodiments of the present disclosure may be implemented.

According to the exemplary embodiment of the present disclosure, the client 110 may request a DML to the processor (510). The DML may include the messages to modify the contents of the database, such as insert, update, and delete and the select message only to read the database contents. The control thread 131 of the processor 130 of the computing device 100 may store a DML message in a memory database (DB) queue by receiving a request (520). The worker thread 133 may process the DML message in the memory database (DB) queue (530). The worker thread 133 may transfer whether executing an allocated message is successful or unsuccessful to the control thread 131 (540). The control thread 131 may transfer a result of whether to execute the message to the client 110 (550). The memory database (DB) may be an in-memory database (DB), but the present disclosure is not limited thereto.

The control thread 131 may store the message in a backup database (DB) queue in order to asynchronously update the DML request to the backup database (DB) (560). The worker thread 133 may process the DML message in the backup database (DB) queue (570). The worker thread 133 may transfer whether executing a message is successful or unsuccessful to the control thread 131 (580). The backup database is a disk database.

According to the exemplary embodiment of the present disclosure, when data is modified by the messages such as insert, update, and delete in the memory database, the data may be modified and backed up similarly even in the back-up database. As a result, it may be verified whether the same data exists in the memory database and the back-up database at the time of inquiring the data through the select message. The example is just an example for describing the present disclosure and the present disclosure is not limited thereto.

According to the exemplary embodiment of the present disclosure, when the message is scheduled by varying the operation mode depending on the message contents, the worker thread 133 that receives and executes the message may perform work without locking a shared resource. As a result, CPU overhead does not occur due to a lock contention at the time of approaching the DB. This may assist performance enhancement in an embedded system or a personal PC having low calculation performance and further, DB stability may be achieved by originally blocking the number of cases where deadlock occurs due to the lock contention.

According to the embodiment of the present disclosure, the computing device can process the message without locking a shared resource. The computing device of the embodiment of the present disclosure prevents the lock contention caused by accessing the database by the clients. Therefore, the computing device reduces CPU overhead and the performance of the computing device can be increased.

Figure 6:
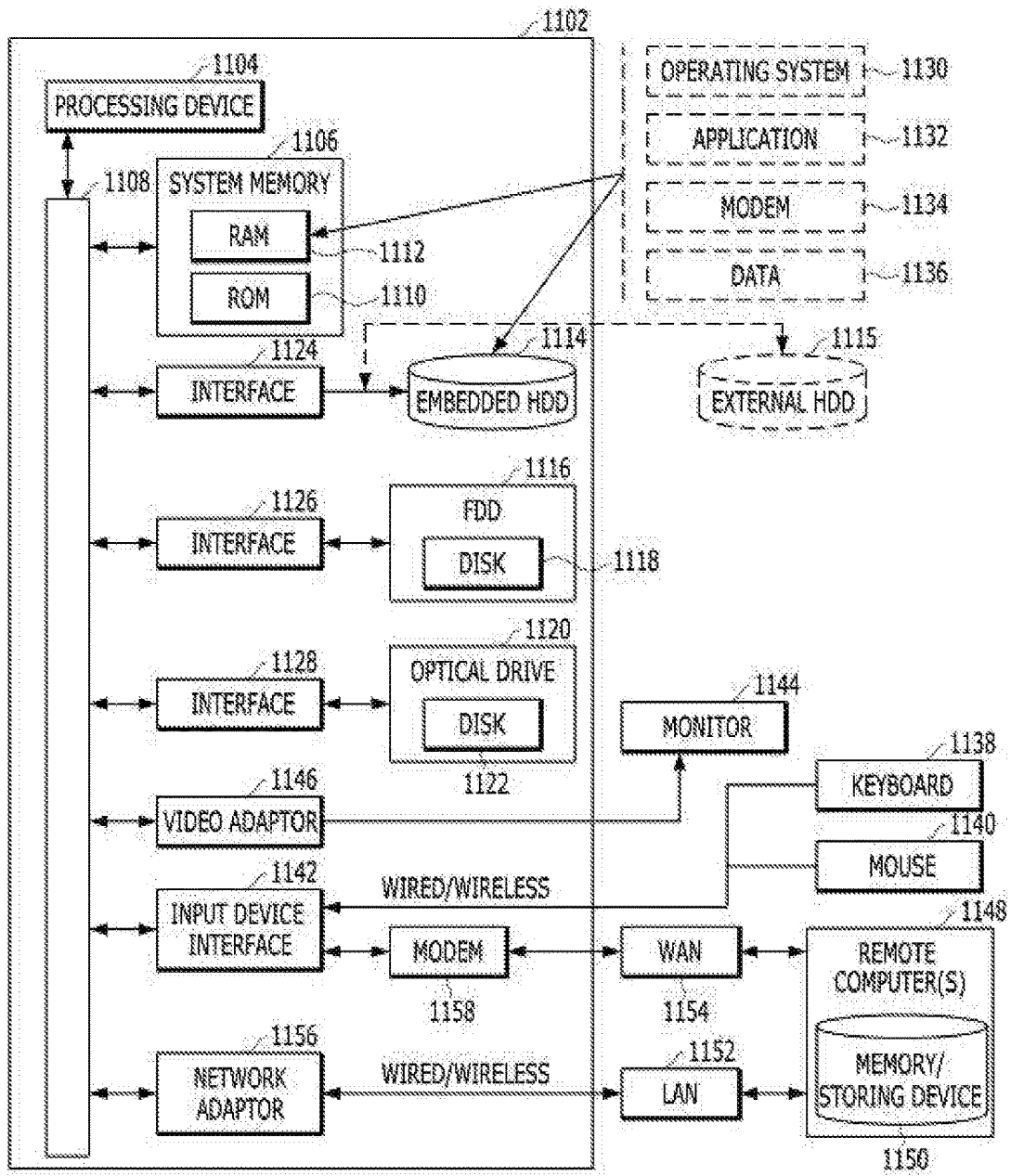
FIG. 6 is a normal and schematic view of an exemplary computing environment in which the exemplary embodiments of the present disclosure may be implemented.

FIG. 6 is a normal and schematic view of an exemplary computing environment in which the exemplary embodiments of the present disclosure may be implemented.

The present disclosure has generally been described above in association with a computer executable command which may be executed on one or more computers, but it will be well appreciated by those skilled in the art that the present disclosure can be implemented through a combination with other program modules and/or a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As not a limit but an example, the computer readable media may include both computer readable storage media and computer readable transmission media. The computer readable storage media include volatile and non-volatile media, temporary or non-temporary media, movable and non-movable media implemented by a predetermined method or technology for storing information such as a computer readable command, a data structure, a program module, or other data. The computer storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable command, the data structure, the program module, or other data in a carrier wave or a modulated data signal such as other transport mechanism and include all information transfer media. The term "modulated data signal" means a signal acquired by configuring or changing at least one of characteristics of the signal so as to encode information in the signal. As an example rather than a limit, the computer readable transmission media include wired media such as a wired network or a direct-wired connection and wireless media such as acoustic, RF, infrared and other wireless media. A combination of anymedia among the aforementioned media is also included in a range of the computer readable transmission media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor or other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an embedded hard disk drive (HDD) 1114 (for example, EIDE and SATA)—the embedded hard disk drive (HDD) 1114 may also be configured for an exterior purpose in an appropriate chassis (not illustrated)-, a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD, and the like). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable command, and others. In the case of the computer 1102, the drives and the media correspond to storing of predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached by the RAM 1112. It will be well appreciated that the present disclosure may be implemented in various operating systems which are commercially usable or a combination of the operating systems.

A user may input commands and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes a speaker, a printer, and other peripheral output devices (not illustrated).

The computer 1102 may operate in a networked environment by using a logical connection to one or more remote computers including remote computer(s) 1148 through wired and/or wireless communication. The remote computer(s) 1148 may be a workstation, a computer device computer, a router, a personal computer, a portable computer, a micro-processor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and the like and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication in the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication computing device on the WAN 1154 or connection through the Internet. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that illustrated network connection is exemplary and it will be well appreciated that other means configuring a communication link among computers may be used.

The computer 1102 performs an operation of communicating with predetermined wireless devices or entities which are disposed and operated by the wireless communication, for example, the printer, a scanner, a desktop and/or portable computer, a portable data assistant (PDA), a communication satellite, predetermined equipment or place associated with a wireless detectable tag, and a telephone. This at least includes wireless fidelity (Wi-Fi) and a Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology for such a device, for example, a cellular phone which enables the computer to transmit and receive data indoors or outdoors, that is, anywhere in a communication range of a base station. The Wi-Fi network uses a wireless technology called IEEE 802.11(a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps(802.11a)

or 54 Mbps (802.11b) in unlicensed 2.4 and 5 GHz wireless bands or operate in a product including both bands (dual bands).

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as "software"), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be analyzed that the implementation determination departs from the scope of the present disclosure.

Various exemplary embodiments presented herein may be implemented as manufactured articles using a method, an apparatus, or a standard programming and/or engineering technique. The term "manufactured article" includes a computer program, a carrier, or a medium which is accessible by a predetermined computer-readable storage device. For example, a computer-readable storage medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but it does not mean that the method claims are limited to the presented specific order or hierarchical structure.

The description of the presented exemplary embodiments is provided so that those skilled in predetermined art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the embodiments presented herein, but should be analyzed within the widest range which is consistent with the principles and new features presented herein.

What is claimed is:

1. A message scheduling method performed by one or more processors of a computing device, the method comprising:
   receiving, by a control thread, a message which is an exclusive mode message which needs to be exclusively processed or a shared mode message enabled to be processed in parallel from a client;
   adding, by the control thread, a flag to the received message based on contents of the message;
   storing, by the control thread, the message with the flag added in a queue corresponding to a workgroup of one or more workgroups that is a minimum unit which needs to maintain the consistency according to information of the received message;
   determining, by the control thread, whether the message is an exclusive mode message or a shared mode message based on the flag of the message stored in the queue;
   allocating, by the control thread, the exclusive mode message corresponding to the workgroup to one worker thread when the message is an exclusive mode message, and allocating, by the control thread, a next message in the queue after receiving a processing completion report from the worker thread,
   allocating, by the control thread, the shared mode message corresponding to the workgroup to one worker thread when the message is a shared mode message, and determining whether to allocate a next message in the queue to another worker thread regardless of whether the processing completion report from the worker thread is received or not; and
   waiting, by the control thread, for allocating the next message until receiving the processing completion report from the worker thread when the next message is an exclusive mode message, and allocating the next message to another worker thread when the next message is a shared mode message.

2. The method of claim 1, wherein the flag includes information for dividing the exclusive mode message which needs to be exclusively processed and the shared mode message which is enabled to be processed in parallel.

3. The method of claim 1, wherein the adding of the flag to the received message based on the contents of the message by the control thread includes
   determining, by the control thread, an operation mode for processing the corresponding message by determining whether the corresponding message needs to be exclusively processed or is enabled to be processed in parallel based on the contents of the message, and
   adding the flag to the message based on the determination by the control thread.

4. The method of claim 1, wherein the exclusive mode as an operation mode when the contents of the message need to be exclusively processed for consistency is an operation mode in which the exclusive mode message is processed by one worker thread and when processing the exclusive mode message is completed, a next message stored in the queue is processed by the worker thread and the shared mode as an operation mode when the contents of the message are enabled to be processed in parallel is an operation mode in which one or more shared mode messages are processed by one or more worker threads in parallel.

5. The method of claim 1, wherein the control thread allocates the exclusive mode messages stored in the queues which belong to different workgroups, respectively to the worker threads in parallel.

6. The method of claim 1, further comprising:
receiving, by the control thread, a message execution result from the worker thread; and
transferring, by the control thread, the received message execution result to the client.

7. The method of claim 1, further comprising:
storing, by the control thread, the message in a back-up database queue in order to asynchronously update the received message to a back-up database;
allocating, by the control thread, the message in the back-up database queue to the worker thread; and
receiving, by the control thread, the message execution result from the worker thread.

8. A computing device for providing message scheduling, the device comprising:
one or more processors;
a memory storing commands executable in the one or more processors and including a queue for storing a message with a flag add depending on a message content;
wherein the one or more processors
receive a message which is an exclusive mode message which needs to be exclusively processed or a shared mode message which is enabled to be processed in parallel from a client, and adding a flag to the message based on message contents and storing the message with the flag added in a queue corresponding to a workgroup of one or more workgroups that is a minimum unit which needs to maintain the consistency according to information of the received message, and
determine whether the message is an exclusive mode message or a shared mode message based on the flag of the message stored in the queue,
allocate the exclusive mode message corresponding to the workgroup to one worker thread when the message is an exclusive mode message, and allocate a next message to the worker thread in the queue after receiving a processing completion report from the worker thread
allocate the shared mode message corresponding to the workgroup to one worker thread when the message is a shared mode message, and determine whether to allocate a next message in the queue to another worker thread regardless of whether the processing completion report from the worker thread is received or not; and
wait for allocating the next message until receiving the processing completion report from the worker thread when the next message is an exclusive mode message, and allocate the next message to another worker thread when the next message is a shared mode message.

9. A computer program stored in a computer readable storage medium, which includes encoded commands, wherein when the computer program is executed by one or more processors of a computer system, which allows the one or more processor to perform the following steps for providing message scheduling, the steps comprising:
receiving, by a control thread, a message which is an exclusive mode message which needs to be exclusively processed or a shared mode message which is enabled to be processed in parallel from a client;
adding, by the control thread, a flag to the received message based on contents of the message;
storing, by the control thread, the message with the flag added in a queue corresponding to a workgroup of one or more workgroups that is a minimum unit which needs to maintain the consistency according to information of the received message; and
determining, by the control thread, whether the message is an exclusive mode message or a shared mode message based on the flag of the message stored in the queue;
allocating, by the control thread, the exclusive mode message corresponding to the workgroup to one worker thread when the message is an exclusive mode message, and allocating, by the control thread, a next message in the queue after receiving a processing completion report from the worker thread,
allocating, by the control thread, the shared mode message corresponding to the workgroup to one worker thread when the message is a shared mode message, and determining whether to allocate a next message in the queue to another worker thread regardless of whether the processing completion report from the worker thread is received or not; and
waiting, by the control thread, for allocating the next message until receiving the processing completion report from the worker thread when the next message is an exclusive mode message, and allocating the next message to another worker thread when the next message is a shared mode message.

* * * * *